US010042866B2

(12) United States Patent
Lin et al.

(10) Patent No.: US 10,042,866 B2
(45) Date of Patent: Aug. 7, 2018

(54) SEARCHING UNTAGGED IMAGES WITH TEXT-BASED QUERIES

(71) Applicant: ADOBE SYSTEMS INCORPORATED, San Jose, CA (US)

(72) Inventors: Zhe Lin, Fremont, CA (US); Jonathan Brandt, Santa Cruz, CA (US); Xiaohui Shen, San Jose, CA (US); Jae-Pil Heo, Cheongju (KR); Jianchao Yang, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 135 days.

(21) Appl. No.: 14/788,113

(22) Filed: Jun. 30, 2015

(65) Prior Publication Data
US 2017/0004383 A1    Jan. 5, 2017

(51) Int. Cl.
*G06K 9/62* (2006.01)
*G06F 17/30* (2006.01)

(52) U.S. Cl.
CPC .. *G06F 17/30268* (2013.01); *G06F 17/30277* (2013.01); *G06K 9/6215* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 2004/0073561 A1* | 4/2004 | Torres | G06F 17/30864 |
| 2005/0010553 A1* | 1/2005 | Liu | G06F 17/30265 |
| 2007/0203897 A1* | 8/2007 | Ueno | G06F 17/3087 |
| 2008/0065606 A1* | 3/2008 | Boys | G06F 17/30256 |
| 2009/0154795 A1* | 6/2009 | Tan | G06K 9/6215 |
| | | | 382/155 |
| 2013/0282712 A1* | 10/2013 | Brandt | G06F 17/30277 |
| | | | 707/731 |
| 2014/0188842 A1* | 7/2014 | Vuong | G06F 17/3025 |
| | | | 707/722 |
| 2015/0244833 A1* | 8/2015 | Grue | H04L 67/322 |
| | | | 709/219 |

(Continued)

OTHER PUBLICATIONS

Wang, Bing, Xin Zhang, and Na Li. "Relevance feedback technique for content-based image retrieval using neural network learning." Machine Learning and Cybernetics, 2006 International Conference on. IEEE, 2006. 5 pages.*

*Primary Examiner* — Ryan P Potts
(74) *Attorney, Agent, or Firm* — Shook, Hardy & Bacon L.L.P.

(57) ABSTRACT

In various implementations, a personal asset management application is configured to perform operations that facilitate the ability to search multiple images, irrespective of the images having characterizing tags associated therewith or without, based on a simple text-based query. A first search is conducted by processing a text-based query to produce a first set of result images used to further generate a visually-based query based on the first set of result images. A second search is conducted employing the visually-based query that was based on the first set of result images received in accordance with the first search conducted and based on the text-based query. The second search can generate a second set of result images, each having visual similarity to at least one of the images generated for the first set of result images.

20 Claims, 7 Drawing Sheets

(56) References Cited

U.S. PATENT DOCUMENTS

2016/0140146 A1* 5/2016 Wexler ............ G06F 17/30253
707/741
2017/0357878 A1* 12/2017 Sawhney .......... G06F 17/30244

* cited by examiner

SEARCHING UNTAGGED IMAGES WITH TEXT-BASED QUERIES

BACKGROUND

Internet-based search engines traditionally employ common image search techniques for locating digital image content on the World Wide Web. These well-known image search techniques can be categorized into "text-based" image searches and "visually-based" image searches.

Traditional text-based image searches may receive a text-based query used for searching a database having keyword-tagged images to generate a resulting set of images that each has one or more keyword tags matching the text-based query. These text-based searches rely primarily on the quality of the keyword tags associated with an image, while ignoring the image's visual information. Traditional visually-based image searches, on the other hand, may receive an image as a visually-based query for searching a database of images, irrespective of the each image having keyword tags associated therewith, to generate a resulting set of images that each has visually similar characteristics to the visually-based query image.

While traditional image search techniques can oftentimes generate desirable results, the generation of quality results in text-based image searches may depend on the quality of the images in the image database on which the search is conducted. With particular regards to visually-based image searches, the generation of quality results may depend on the quality, or even the existence of, the visually-based search query itself. For example, a text-based image search can only produce desirable results if the database on which the search is performed includes keyword-tagged images. In this regard, if an image database comprised, among many other images, thousands of images of a football game, none of which had a keyword tag associated with keywords "football" or "game," a text-based image search with a text-based query (i.e., a descriptive keyword) of "football game" would not generate any desirable results. In another example, a visually-based image search can only generate desirable results if provided with a visually-based query (i.e., an exemplary image). In this regard, if a user wanted to search the image database to locate images from the football game, the user would need to have at least one image having visually similar characteristics to the images from the football game to construct the search query. As such, traditional image search techniques can be rather restrictive and limited in scope.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention are directed to exploiting the benefits of both the image-based search and the visually-based search by providing a "free" (non-restrictive) text-based image search. More specifically, in embodiments of the present invention, a computing device can search an untagged image database when provided with a text-based query. In embodiments, a subset of example images is generated from a text-based image search based on a received text-based query. The subset of example images generated from the text-based image search is used to generate one or more image queries used to conduct a subsequent visually-based image search. In this regard, images resulting from the visually-based image search are returned in response to the received text-based query.

In one embodiment, the computing device can employ a publicly accessible image search engine to conduct the text-based image search and generate the subset of example images to generate the visually-based query. For example, if a text-based search for "football game" was conducted on an untagged image database having, among many other images, thousands of images of a football game, the computing device can submit the "football game" text-based query to a publicly accessible image search engine (e.g., Adobe® Fotolia®, Adobe® Behanced®, Google® Images, Bing® Images, Yahoo!® Image Search) to generate a subset of example images based on the text-based image search. The computing device can generate, depending a number of example images in the subset of example images, one or more image queries to conduct one or more visually-based searches on the untagged image database. In this way, the untagged image database can be searched to find visually similar images to the example images generated from the text-based image search.

In another embodiment, the computing device can conduct the text-based image search on an at least partially-tagged image database, and generate a subset of example images from the tagged images of the at least partially-tagged image database to generate the visually-based query. For example, if an image database included at least a plurality of images having keyword tags associated therewith, a text-based image search can be employed to generate a subset of example images from at least the tagged images in the at least partially-tagged image database. Once again, the computing device can generate, depending on a size of the subset of example images, one or more image queries to conduct one or more visually-based searches on the at least partially-tagged image database. In this way, the entirety of the at least partially-tagged image database can be searched to find visually similar images to the example images generated from the text-based image search. In some embodiments, a combination of text-based image search results from (1) an at least partially-tagged image database and (2) a publicly accessible image search engine can be used to generate a subset of example images for generating the visually-based query to conduct visually-based searches on the at least partially-tagged image database.

In some embodiments described herein, relevance feedback can be received after providing results of a visually-based image search based on a text-based query, as described in accordance with the present disclosure. In more detail, as visually-based image search results are generated and provided based on a subset of example images derived from a text-based query, a selection of one or more of the visually-based image search results can be received to generate another subset of example images with which to conduct a more refined visually-based image search. To this end, the relevance feedback feature can be iteratively employed to fine tune results based on a text-based image search performed on an untagged or at least partially untagged image database.

BRIEF DESCRIPTION OF THE DRAWINGS

The present invention is described in detail below with reference to the attached drawing figures, wherein.

DETAILED DESCRIPTION

Figure 1:
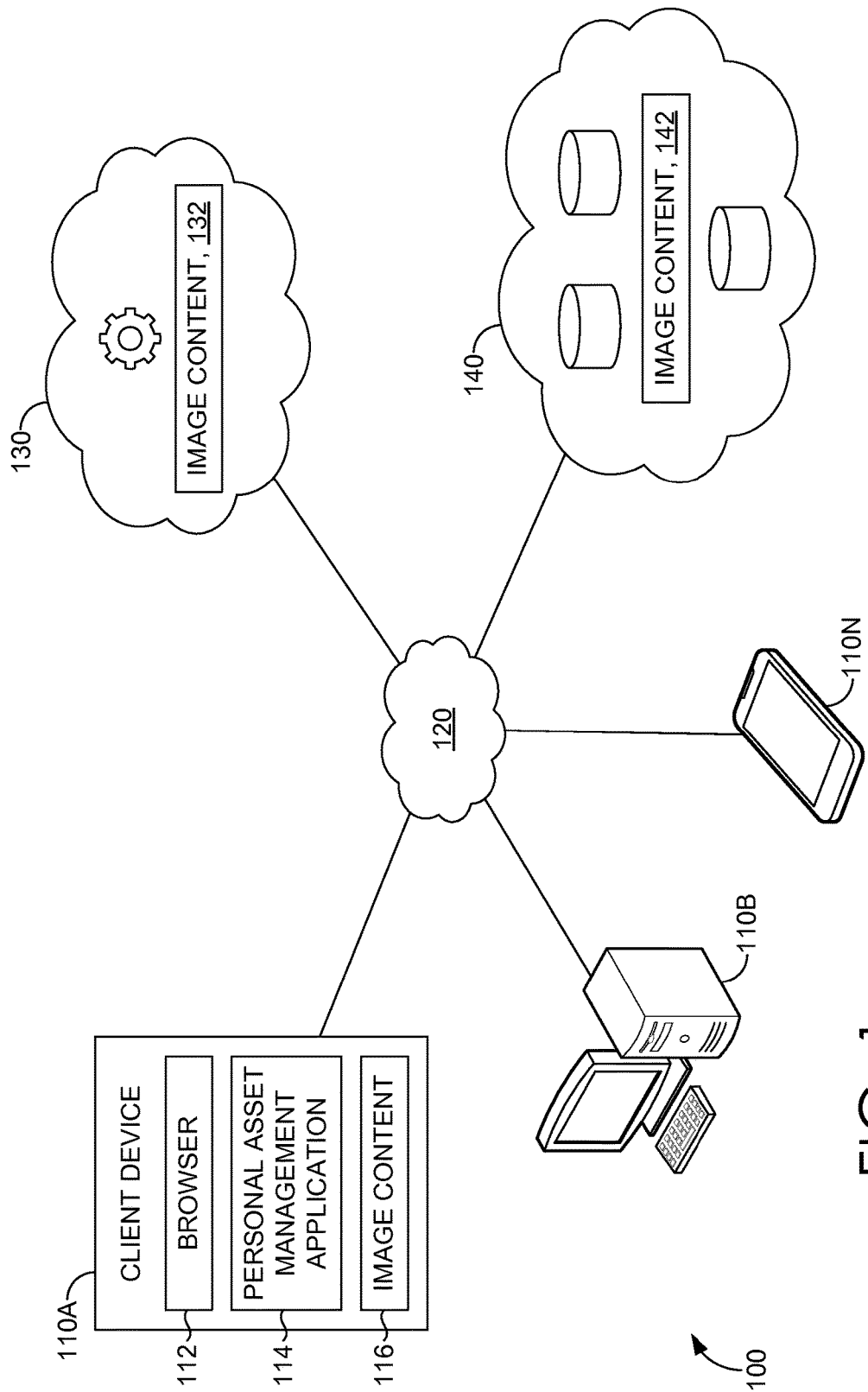
FIG. 1 is a diagram illustrating an exemplary system in accordance with implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Conventional image search engines, employed in local or networked environments including the World Wide Web, can generate image search results based on one of text queries or image queries. Text-based image search engines typically receive a text-based query (i.e., "red ball," "football game," "tiger in cage") that is used to query a tagged image database, wherein each image in the database is tagged with at least one keyword (e.g., "red," "ball," "football," "game," "tiger," "cage") describing characteristics associated with the image. Typically, images are previously tagged with keywords describing the visual characteristics of the image. If one or more tagged images are determined to have at least one keyword associated therewith that corresponds to the text-based query, the image(s) is returned as a search result(s) in response to the text-based query. As used herein, the term "tag" is used to refer to metadata that is included in or otherwise associated with an image and that describes or otherwise indicates some attribute of the image. For example, a tag may include, among other things, descriptions of subject matter depicted in the image, author of the image, editor of the image, time periods associated with the image, or locations associated with or depicted in the image.

Visually-based image search engines, on the other hand, typically receive a visually-based query (i.e., an image of a red ball, an image of a football game, an image of a tiger in a cage) that is used to query an image database, irrespective of the images having tags associated therewith. In other words, the images in the database can be tagged, untagged, or both. By employing an image analyzing algorithm configured to compare (1) visual information associated with the visually-based query, with (2) visual information associated with each image in the database, search results can be generated that have substantially similar visual characteristics to the visually-based query. A disconnect exists, however, between the text-based query and the untagged image database. For example, if a text-based image search is performed on an untagged image database, the search engine would not generate any results, as the untagged images would not provide the search engine with keyword tags to analyze.

As such, embodiments of the present invention are directed to conducting an image search based initially on a text-based query, wherein the image search can generate one or more image search results having image characteristics that correspond to the text-based query irrespective of the image search results having any keyword tags associated therewith. As described in more detail herein, a personal asset management application can be employed to facilitate the searching of images, irrespective of any of the images having keyword tags associated therewith, using only a text-based query. To this end, a user can, among other things, search their personal library of images without tediously categorizing or tagging each and every image to facilitate a text-based search on the images.

In more detail, a personal asset management application, such as Adobe® Photoshop® Lightroom®, can receive a text-based query for searching a database of images managed by the asset management application. The managed database can include tagged, untagged, or a combination of tagged and untagged images. Image tags, as will be described, can include any keyword for describing visual characteristics associated with an image. For example, an image of fireworks behind the Eiffel tower on Bastille Day can have image tags, among others, "Eiffel," "tower," "fireworks," "Paris," and/or "Bastille Day" associated therewith. Irrespective of the images in the database having any tags associated therewith, a text-based query can be received for searching the images in the managed database. As will be used herein, the term "database" is not necessarily limited to a storage database, but can also refer to a collection, catalog, folder, storage location, network location, library, or the like.

After receiving the text-based query, a text-based search engine can be employed to search at least the tagged images in the managed image database, tagged images in a remote image database, images on the World Wide Web (for instance, using Google® Images or the like), or any combination thereof, to receive a first set of result images each having at least one characterizing tag that corresponds to the text-based query. For example, if a user provided search parameter "Eiffel tower and fireworks" with a desired intent to find images having both the "Eiffel tower" and "fireworks," the text-based search engine can receive and process, depending on the configuration, the text-based query to find any images having at least the "Eiffel tower" and "fireworks" keyword tags associated therewith. In some instances, depending on the search algorithm, the "AND" Boolean operator can be limiting such that only images having both keywords are returned as search results. In some other instances, images having at least one or the other keyword can be returned as search results. It is also contemplated that, depending on the strength of the search result (i.e., all keywords being matched as opposed to just one), search results can be ranked based on the strength of the image tags to the corresponding query.

The text-based search engine can be configured for local operation (i.e., part of the personal asset management application or the local operating system), remote access (i.e., part of a cloud-based asset management application), or publicly accessible over the Internet (i.e., part of a web image search engine). It is contemplated that access to any of the aforementioned can be limited by user-based access restrictions. For instance, the local or remote access configurations can be limited to a user having access to a particular set of images (i.e., local access being limited to user account, or the remote access being limited to the user's cloud storage space). It is also contemplated, as was alluded to above, that any combination of the local, remote, or Internet-based configurations can be employed to process the text-based query.

Upon obtaining the first set of result images, one or more images from the first set of result images can be used to generate a visually-based query. The one or more images from the first set of result images used to generate the visually-based query can be determined based on an association score generated by the text-based search engine. For example, a direct hit of all keywords from the text-based query (i.e., an image having at least two tags "Eiffel tower" and "fireworks") could produce a relatively high association score, whereas a partial hit of keywords from the text-based query (i.e., an image having one of tags "Eiffel tower" or "fireworks") could produce a relatively medium association score, whereas no or minimal hit of keywords from the text-based query (i.e., an image having neither tags "Eiffel tower" nor "fireworks", or maybe just "Eiffel" or "tower" or "fire") could produce a relatively low association score.

A visually-based query, comprising the one or more images from the first set of result images received in accordance with the first search conducted based on the text-based query, can now be processed in association with at least one of the managed database or the remote image database. In some embodiments, as will be described herein, the visually-based query can comprise one or more images that are selected from the first set of result images received in accordance with the first search. Processing the visually-based query can generate a second set of result images comprising result images having visual and/or semantic similarity to at least one of the one or more images from the first set of result images received in accordance with the first search conducted based on the text-based query. In other words, an image search, based initially on a text-based query, can generate one or more image search results having image characteristics that correspond to the text-based query, irrespective of any having keyword tags associated therewith. For example, now that a search has been performed for tagged images having keywords "Eiffel tower" and "fireworks," and a search result has been generated comprising only tagged images having these keywords, a set of exemplary images each having, ideally, both the Eiffel tower and fireworks therein is provided to generate a visually-based query. In essence, the images in the example set are now embodied as the search query that will be employed to find other images, tagged or untagged, that are visually and/or semantically similar to the images in the example set.

As used herein, visual similarity refers to similarity between purely visual characteristics of two or more images. Visual similarity between two or more images can be determined by employing a direct image comparison algorithm executed by one or more processing devices. The image comparison algorithm identifying one or more graphical similarities between visual characteristics of two or more images. For example, by comparing image color data, arrangement of image pixel data, image size, and/or other visual image data characteristics associated with the images, the direct image comparison algorithm can determine, among other things, a visual similarity score between two or more images. In essence, the image comparison algorithm can analyze image data associated with two or more separate images to determine that the images are visually similar. For example, the direct image comparison algorithm may determine that two separate images, each having the Eiffel tower isolated front and center, as having a high likelihood of visual similarity. The direct image comparison algorithm may also look, however, at two separate images, one having the Eiffel tower isolated, front and center, the other having an image of a dog front and center with the Eiffel tower offset and in the background, as not having a high likelihood of visual similarity.

Visual similarity can also be determined through a semantic similarity analysis. As used herein, the term "semantic similarity" refers to similarity between aspects of image content that are visible to a user. In some embodiments, semantic similarity includes a similarity between a first set of shapes and spatial relationships in a first image and a second set of shapes and spatial relationships in a second image. In one example, an image of a person's face has a higher semantic similarity to an image of another person and a lower semantic similarity to an image of a building. In another example, an image of two people standing close together has a higher semantic similarity to an image of a crowd of people and a lower semantic similarity to an image of a single person. In additional or alternative embodiments, semantic similarity includes a similarity between a first image style in a first image and a second image style in a second image. For example, vectors representing color or contrast information can be calculated for two images. The stylistic similarity can be determined by calculating a distance between these vectors. A larger calculated distance indicates a lower degree of stylistic similarity, and a smaller calculated distance indicates a higher degree of stylistic similarity.

Semantic similarity can be determined between two or more images by employing a neural network or other classifier algorithm executed by one or more processing devices. The network or algorithm can identify one or more associations between the semantic content of an image and a class of semantically similar images. For example, a neural network or other classifier algorithm may analyze training images with certain recurring objects, color schemes, or other semantic content and determine that the objects, color schemes, or other semantic content are indicative of a certain class of content (e.g., "dogs," "vehicles," "trees," etc.). The neural network or other classifier algorithm may apply the learned associations between different classes and different types of semantic content to classify subsequently received images. An example of a classifier algorithm is an algorithm that uses a neural network model to identify associations between certain semantic features and certain classes of semantic content. As such, using the Eiffel tower example above, the neural network or classifier algorithm may look at the two separate images, one having the Eiffel tower isolated, front and center, the other having an image of a dog front and center with the Eiffel tower offset and in the background, as having at least some semantic similarity (i.e., both having the Eiffel tower depicted within the image).

Turning now to FIG. 1, a diagram is provided illustrating an exemplary system in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 can be a client only system or a client-server system that can be utilized to facilitate text-based image searching of untagged images. Among other components not shown, the system 100 can include any number of client devices, such as client devices 110*a* and 110*b* through 110*n*, network 120, one or more remote image search servers 130, and one or more remote storage servers 140. Although illustrated as including a remote image search server 130 and a remote storage server 140, embodiments can include both, one or the other, or neither. It should be understood that any number of servers and client devices may be employed within system 100 within the scope of the present disclosure. Each may comprise a single device or multiple devices cooperating in a distributed environment. Additionally, other components not shown may also be included within the distributed environment.

It should further be understood that system 100 shown in FIG. 1 is an example of one suitable computing system architecture. Each of the servers and client devices shown in FIG. 1 may be implemented via a computing device, such as computing device 600, later described with reference to FIG. 6, for example. The components may communicate with each other via network 120.

Network 120 may be wired, wireless, or both. Network 120 may include multiple networks, or a network of networks, but is shown in simple form so as not to obscure aspects of the present disclosure. By way of example, network 120 can include one or more wide area networks (WANs), one or more local area networks (LANs), one or more public networks, such as the Internet, and/or one or more private networks. Where network 120 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 120 is not described in significant detail.

In various implementations, client devices 110*a* and 110*b* through 110*n* are computing devices that are capable of accessing the Internet, such as the World Wide Web. Client devices might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

Client devices 110*a* and 110*b* through 110*n* can include one or more processors, and one or more computer-readable media. The computer-readable media may include computer-readable instructions executable by the one or more processors. The instructions may correspond to one or more applications, such as browser 112 and personal asset management application 114, shown on client device 110*a*. The client devices 110*a* and 110*b* through 110*n* can be configured to store, among other things, content such as image content 116. The image content 116 can be stored, for instance, on one or more computer-readable media.

Browser 112, such as a web browser, can be an HTTP-compatible application (e.g. an Application that supports an HTTP protocol). A specific example of browser 112 is a Google® Chrome® web browser. Personal asset management application 114 may be independently installed on the client device as a standalone application, or can be accessed through a web-based application hosted by server 130,140, and accessible to client devices by the browser 112. A specific example of a personal asset management application 114 is Adobe® Photoshop® Lightroom®. In some instances, the personal asset management application 114 is accessible over the web (i.e., a cloud-based web application) through the browser 112. The personal asset management application 114 is configured to communicate with one or more servers, such as servers 130,140 via network 120, which may comprise the Internet.

Server 130 can be a web server configured to provide a publicly accessible image search service (e.g., Adobe® Fotolia®, Adobe® Behanced®, Google® Images, Bing® Images, Yahoo!® Image Search) for hosting and providing an image search engine for searching content, such as image content 132 for a client device, such as client device 110*a*. As a specific example, server 130 can receive a text-based query from the client device 110*a*, the query comprising one or more keywords describing desired image characteristics. The server 130 can then process the text-based query to locate images having, among other things, image tags matching at least a portion of the text-based query by searching one or more image databases hosted in association with the server 130 or by searching the World Wide Web. In some instances, the text-based query will be processed to locate images having strong correlations to at least a portion of the text-based query (for instance, if a search engine generated search results based on webpage content associated with the image). The server 130 can then return, to the client device 110*a*, at least a portion of the set of result images as a text-based image search result.

Server 140 can be a web server configured to provide a remote storage service (i.e., a cloud storage service) for hosting, among other things, content, such as image content 142, for a client device, such as client device 110*a*. As a specific example, server 140 can receive, among other things, one or more images from client device 110*a* for remotely storing the one or more images. In some instances, the remote storage service can also provide an image search engine for searching and viewing content stored therein. It is contemplated that the image search engine can offer similar search functionalities as the image search engine as described with respect to server 130. It is further contemplated that access to the server 140 can be limited by user-based access restrictions (i.e., user accounts/passwords). A specific example of a remote storage service is the Adobe® Creative Cloud®.

Image content 116,132,142 is shown as being on the client device 110*a* and servers 130,140, respectively, for illustrative purposes only. However, in various implementations, image content can be on the client device 110*a*, server 130, server 140, or any combination thereof. Further, client device 110*a* and server 130,140, and/or other constituents of the system 100 not specifically shown may include portions and/or segments of image content 116,132,142. For example, system 100 may include various forms of cache(s), storage device(s), and/or database(s) that may assist in storing image content for and providing image content to client device 110*a*.

Figure 2:
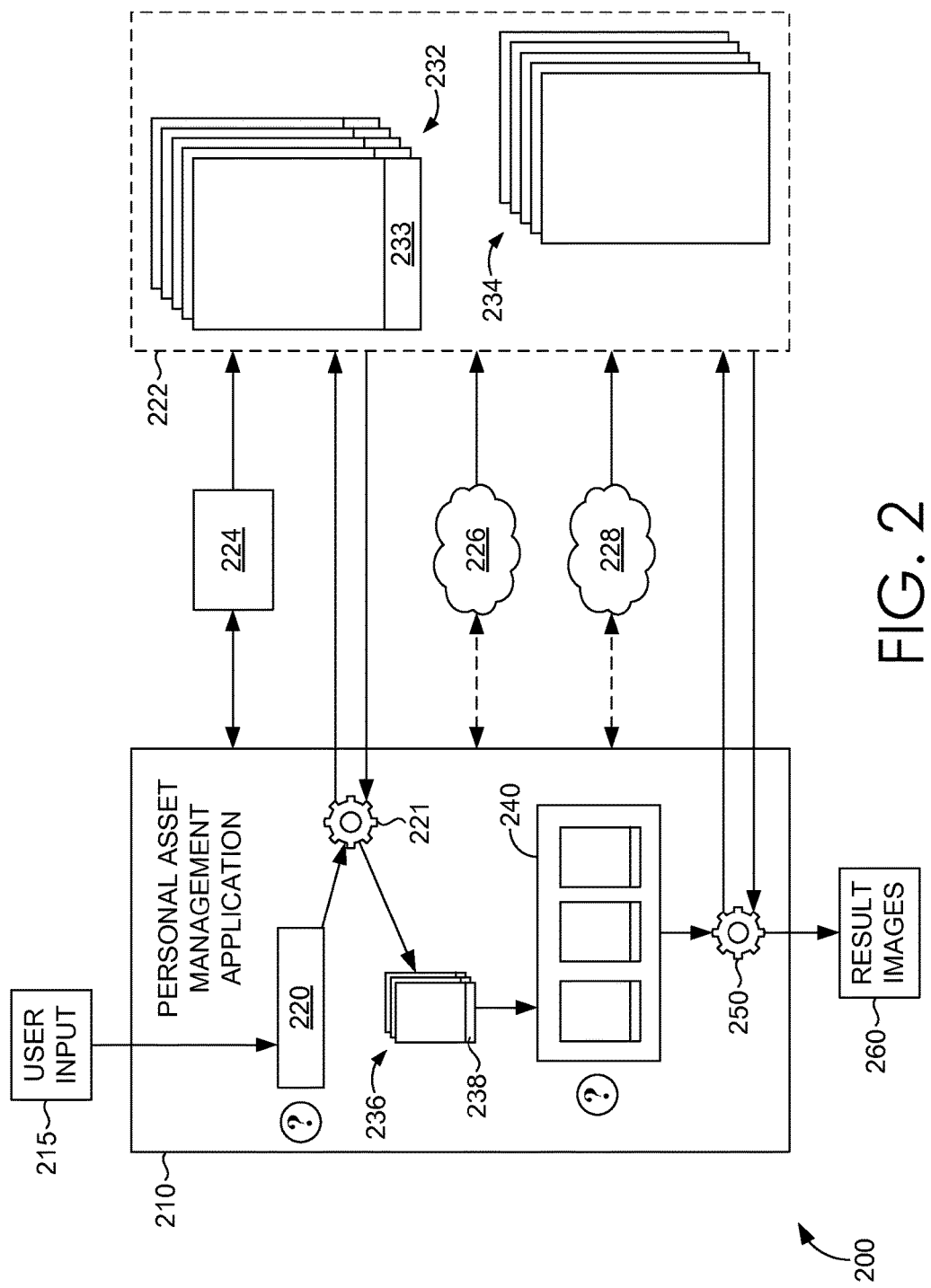
FIG. 2 illustrates a process flow diagram of an exemplary personal asset management application in accordance with implementations of the present disclosure.

Referring now to FIG. 2, a diagram is provided depicting a process flow 200 in which a personal asset management application 210 (for instance, personal asset management application 114 of FIG. 1) uses a text-based query 220 to search a plurality of images 222 to generate a visually-based query 240 that is based on the text-based query 220. The plurality of images 222 can include images stored in a local storage device 224 (i.e., coupled to the computing device(s) hosting the asset management application 210), images stored remotely with a remote storage service 226, images retrieved and/or stored remotely with a publicly accessible image search service 228, or any combination thereof.

The plurality of images can also include a subset of tagged images 232, a subset of untagged images 234, or any combination thereof. In other words, the plurality of images 222 can be any collection of images, wherein at least some of the images of the collection has tags associated therewith for processing the text-based query thereon.

In a simplified example, the personal asset management application 210 receives a user input 215 (i.e., a string of text) to build a text-based query 220, processes the text-based query 220 to search the plurality of images 222 to generate text-based query search results 236, the search results 236 including one or more images from the subset of tagged images 232 that each have associated tags 233 that match at least a portion of the text-based query 220. The search result images 236, generally having a strong correlation between each of their associated tags 238 and the text-based query 220, are used to generate a visually-based query 240. In various implementations, the visually-based query 240 can be processed in association with images stored in a local storage device 224, with images stored in remote storage service 226, or in some instances, with a combination of both sources of image content 224,226.

The text-based query 220 can comprise any combination of characters that can identify a desired characteristic depicted or associated with a result image. For instance, the text-based query can include keywords (i.e., dominant colors appearing in the image, objects or people depicted in the image, authors/dates/locations associated with the image, etc.). As an example, if a user provided search parameter "Eiffel tower and fireworks", the text query would comprise precisely the term "Eiffel tower and fireworks". In some embodiments, the text-based query 220 can reformat the terms of the text query to comply with operands associated with the search algorithm. For example, if Boolean operators were supported by the text-based search algorithm, the text-based query 220 could be reformatted to "Eiffel" OR "tower" AND "fireworks." Variations of such operations are well-known in the art and are considered within the scope of the present invention.

In some embodiments, processing the text-based query 220 can include employing a locally implemented text-based image search engine 221 to determine, from the plurality of images 222, text-based query search results 236 including one or more tagged images that each have associated tags 233 that match at least a portion of the text-based query 220. For example, if a user provides search parameter "Eiffel tower and fireworks" with a desired intent to find images having both the "Eiffel tower" and "fireworks," the text-based search engine can receive and process, depending on the configuration thereof, the text-based query to find any images having at least the "Eiffel tower" and/or "fireworks" keyword tags associated therewith. In some instances, depending on the search algorithm, the "AND" Boolean operator can be limiting such that only images having both keywords are returned as search results. In some other instances, images having at least one or another keyword can be returned as search results. It is also contemplated that, depending on the strength of the search result (i.e., all keywords being matched as opposed to just one), search results can be ranked based on the strength of the image tags to the corresponding query.

In some other embodiments, processing the text-based query 220 can include employing a remotely implemented text-based image search engine (not shown) to determine, from the plurality of images 222, text-based query search results 236 including one or more tagged images that each have associated tags 233 that match at least a portion of the text-based query 220, as similarly described with respect to the locally-implemented text-based image search engine 221. In even further embodiments, processing the text-based query 220 can include initiating a search employing a publicly accessible image search service 228. For instance, the text-based query 220 can be communicated to the publicly accessible image search service 228 as a search parameter, and further request a generation of search result images 236 from the image search service 228, as was similarly described with respect to the locally 221 or remotely (not shown) implemented text-based image search engines.

The plurality of images 222 can include images that are stored locally on a computer readable medium that is coupled to or in communication with the client computing device. For instance, in some embodiments described herein, the free text image search can be performed using only locally stored images. It is contemplated, however, that a locally implemented text-based image search engine, as was described, can only generate text-based query search results 236 if at least some of the locally stored images have relevant tags associated therewith. Thus, if a user wanted to search a large, locally-stored library of images, some having tags associated therewith, and others not having tags associated therewith, embodiments as described in the present disclosure can process a text-based query on the tagged images to generate a visually-based query based on results derived from the text-based query. To this end, the visually-based query can be processed on the locally-stored library of images to generate visually-based image search results including a set of visually or semantically similar images, thereby producing search results based on the initial text-based query (i.e., the "free text").

In some instances, the plurality of images 222 can include images that are stored remotely on a cloud-based storage device, such as remote storage service 226. In this regard, the personal asset management application 210 can be configured to communicate with the remote storage service 226 to include image content stored therewith, in the application's 210 managed image library. In other instances, the remote storage service 226 can be mapped as a local storage device accessible by the personal asset management application 210 and added to its library of managed images. Images managed by the personal asset management application 210 can be searched using the free text image search features described in accordance with embodiments of the present disclosure.

In some implementations, the personal asset management application 210 may primarily or exclusively employ a publicly accessible image search service 228 to generate the visually-based query 240. With brief reference now to FIG. 3, a diagram is provided depicting a process flow 300 in which a personal asset management application 310 (for instance, personal asset management application 114 of FIG. 1) receives a user input 315 (i.e., a string of text) to build a text-based query 320, sends the text-based query 320 to publicly accessible image search service 330 to initiate an image search (i.e., by crawling the World Wide Web or searching remotely stored/cached images) to generate a set of text-based search results 340 including one or more search result images having image tags or metadata associated therewith that match at least a portion of the text-based query 320, as described in accordance with embodiments described herein. The personal asset management application 310 can thereby generate, based on one or more of the search result images, a visually-based query 350 that is based on the text-based query 320. Consequently, the personal asset management application 310 can process the visually-based query on a managed plurality of images, for instance, the plurality of images 222 of FIG. 2 also portrayed as image database 360, to generate one or more visually-based search result images.

Figure 3:
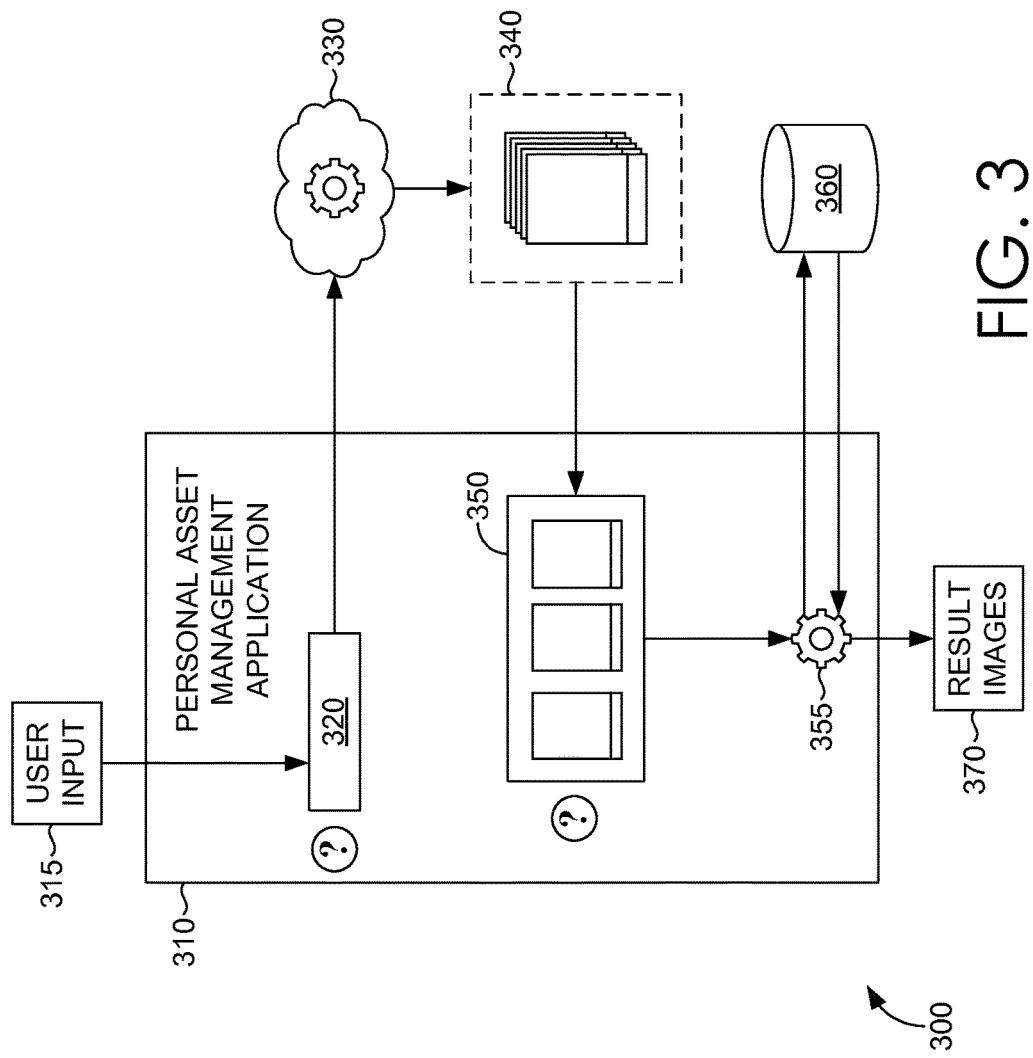
FIG. 3 illustrates a process flow diagram of an exemplary personal asset management application in accordance with implementations of the present disclosure.

In various implementations of embodiments described herein, looking now with reference to both FIGS. 2 and 3, the visually-based query 240,350 can be processed by a visually-based search engine 250,355 in association with images 222,360 managed by the personal asset management application 210,310, to generate one or more visually-based search result images 260,370. The result images 260,370 can be provided as raw data, on a webpage, in a data structure, or the like. The images managed by the personal asset management application can be tagged, untagged, or include a combination of both. The visually-based image search engine 250,355 can be locally or remotely implemented, as was similarly described with respect to the text-based image search engine hereinabove. As was also described, in either implementation, the visually-based search engine 250,355 can be configured to search for images 222,360 that are generally managed by the personal asset management application 210,310 and are visually and/or semantically similar to the visually-based search query 240,350, depending on the visual similarity algorithm employed by the visually-based search engine 250,355.

As was described, visual similarity refers to similarity between purely visual characteristics of two or more images. Visual similarity between two or more images can be determined by employing a direct image comparison algorithm executed by one or more processing devices, the algorithm identifying one or more graphical similarities between visual characteristics of two or more images. For example, by comparing image color data, arrangement of image pixel data, image size, and/or other visual image data characteristics associated with the images, the direct image comparison algorithm can determine, among other things, a visual similarity score between two or more images. In essence, the image comparison algorithm can analyze image data associated with two or more separate images to determine that the images are visually similar. For example, the direct image comparison algorithm may determine that two separate images, each having the Eiffel tower isolated front and center, as having a high likelihood of visual similarity. The direct image comparison algorithm may also look, however, at two separate images, one having the Eiffel tower isolated, front and center, the other having an image of a dog front and center with the Eiffel tower offset and in the background, as not having a high likelihood of visual similarity.

Semantic similarity refers to similarity between aspects of image content that are visible to a user. In some embodiments, semantic similarity includes a similarity between a first set of shapes and spatial relationships in a first image and a second set of shapes and spatial relationships in a second image. In one example, an image of a person's face has a higher semantic similarity to an image of another person and a lower semantic similarity to an image of a building. In another example, an image of two people standing close together has a higher semantic similarity to an image of a crowd of people and a lower semantic similarity to an image of a single person. In additional or alternative embodiments, semantic similarity includes a similarity between a first image style in a first image and a second image style in a second image. For example, vectors representing color or contrast information can be calculated for two images. The stylistic similarity can be determined by calculating a distance between these vectors. A larger calculated distance indicates a lower degree of stylistic similarity, and a smaller calculated distance indicates a higher degree of stylistic similarity.

Semantic similarity can be determined between two or more images by employing a neural network or other classifier algorithm executed by one or more processing devices, the neural network or algorithm identifying one or more associations between the semantic content of an image and a class of semantically similar images. For example, a neural network or other classifier algorithm may analyze training images with certain recurring objects, color schemes, or other semantic content and determine that the objects, color schemes, or other semantic content are indicative of a certain class of content (e.g., "dogs," "vehicles," "trees," etc.). The neural network or other classifier algorithm may apply the learned associations between different classes and different types of semantic content to classify subsequently received images. An example of a classifier algorithm is an algorithm that uses a neural network model to identify associations between certain semantic features and certain classes of semantic content. As such, using the Eiffel tower example above, the neural network or other classifier algorithm may look at the two separate images, one having the Eiffel tower isolated, front and center, the other having an image of a dog front and center with the Eiffel tower offset and in the background, as having at least some semantic similarity (i.e., both having the Eiffel tower depicted within the image).

It is contemplated that neural networks or other classifier algorithms need to be trained in order to identify semantic similarity. Though not described herein, disclosure for the training of neural networks and/or other classifier algorithms to identify semantic similarity is incorporated herein with particular reference to U.S. Non-Provisional patent application Ser. No. 14/747,877, entitled TRAINING A CLASSIFIER ALGORITHM USED FOR AUTOMATICALLY GENERATING TAGS TO BE APPLIED TO IMAGES, which is hereby incorporated in its entirety by reference herein.

In some embodiments, after the visually-based query 240,350 is processed by the visually-based search engine 250,355 in association with images 222,360 managed by the personal asset management application 210,310, the result images 260,370 can be provided for display to a user (generally, to the user that input the search parameters 215,315 to the personal asset management application 210, 310). The result images 260,370 can be provided for display on a dynamic window or webpage, preferably in a thumbnail format, for facilitating efficient navigation through the result images. Each of the result images 260,370 can be associated with an input interface for receiving user input. In more detail, the result images 260,370 can be clicked on, touched, or "selected" to receive user feedback on the relevance of the result image with respect to the user's personal preferences.

In some instances, a selection of an image can indicate an image that is relevant to the user's search preferences. For example, if the initial text-based query of "Eiffel tower and fireworks" was processed through the free text image search feature to ultimately generate a plurality of images, it is possible that the resulting images can depict, for example, the Eiffel tower with fireworks behind, in front of, or beside, the Eiffel tower, the Eiffel tower with a fireworks advertisement superimposed thereon, or even the Eiffel tower being on fire. If the user preferred that the search results only include images of the Eiffel tower with fireworks behind the tower, then one or more images depicting such a configuration can be selected by the user.

In some embodiments, selection of the one or more relevant images can dynamically generate a new visually-based query based on the selected one or more relevant images. To this end, the user can initiate a subsequent visually-based search using the new visually-based query comprising the one or more selected relevant images. Consequently, the search results would become more relevant as this process is iteratively performed. For example, if the only search result images selected by the user were of the Eiffel tower having fireworks going off behind the tower, then it is likely that, at least, the images of the Eiffel tower having fireworks advertisements superimposed thereon, and the images of the Eiffel tower on fire, would be removed from consideration. Further, in subsequent iterations of the relevance feedback, if selected result images were further refined to identify only those images having the Eiffel tower with fireworks displayed behind the tower, it is possible that the desired images will result as relevance feedback is continuously provided. It is contemplated, however, that the intelligence of the visual image search engine is dependent on depth of the neural network or other classifier algorithms and its capability of determining such differences.

Figure 4:
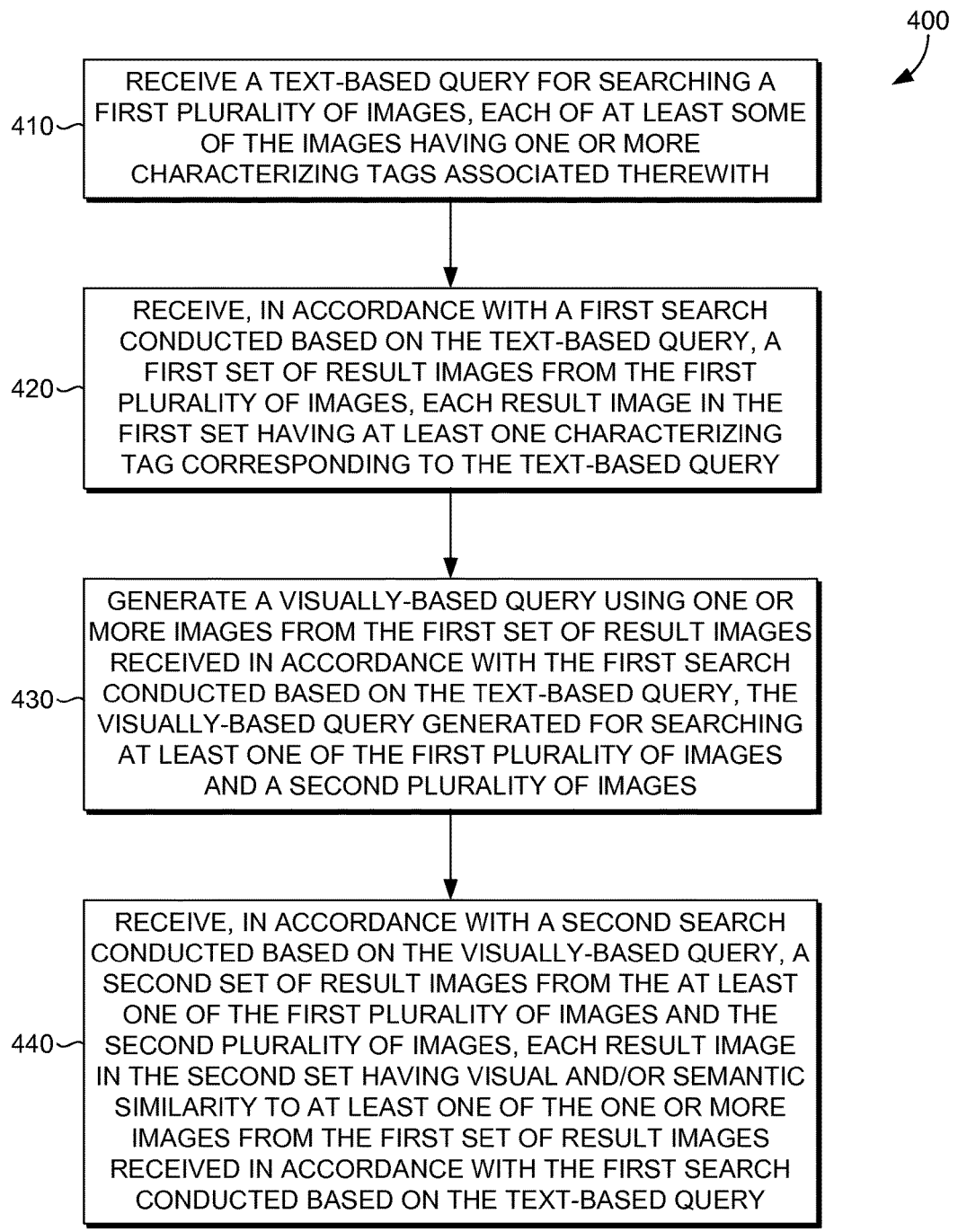
FIG. 4 is a flow diagram showing a method for searching a plurality of images with a text-based query, irrespective of images having tags associated therewith, in accordance with implementations of the present disclosure.
Figure 7:
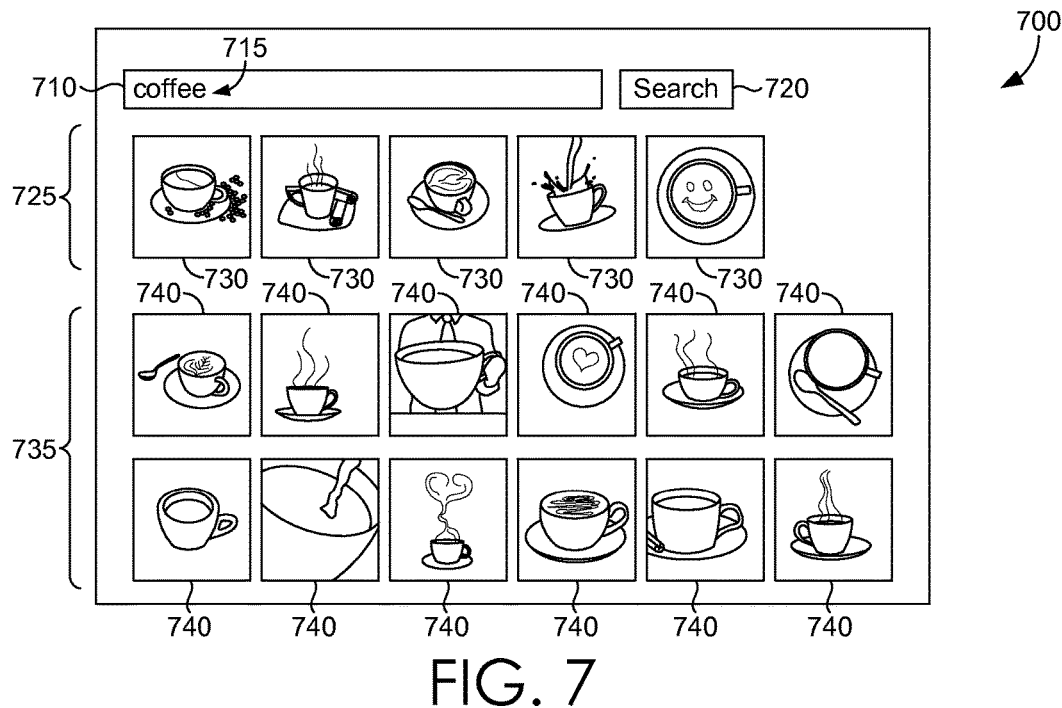
FIG. 7 is an exemplary graphical user interface for a personal asset management application, in accordance with implementations of the present disclosure.

Having described various aspects of the present disclosure, exemplary methods are described below for facilitating "free text image search," or in other words, searching untagged images with a text-based query. Referring to FIGS. 4 and 7 in light of FIGS. 1 and 2, FIG. 4 is a flow diagram showing a method 400 for searching a plurality of images with a text-based query, irrespective of the images having tags associated therewith. FIG. 7 will be briefly referenced to illustrate various aspects of embodiments described herein. Each block of method 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 410, a text-based query (e.g., query 715 of FIG. 7) is received for searching a first plurality of images. The text-based query can comprise any combination of characters (e.g., numbers or letters) configured for identifying characteristics associated with a desired search result. In other words, the text-based query includes one or more keywords that are the subject of the search. For example, the text-based query can be received in a search form (e.g., search form 710 of FIG. 7) by the personal asset management application 210,310, the application being implemented locally or implemented remotely but accessible locally, as was described. Some of the first plurality of images, which are subject to the text-based image search, can have one or more characterizing tags associated therewith. In other words, images that are subject to the text-based search may or may not have tags associated therewith. It is contemplated, however, that in order to generate a result from the search, as described herein, it may be desirable to have at least one image in the plurality that has at least one tag associated therewith.

Continuing at block 420, in accordance with the search conducted based on the text-based query, each result image (e.g., result image(s) 730 of FIG. 7) from the text-based image search is received. For instance, among the first plurality of images that were searched, only the images that have an associated tag that matches at least a portion of the text-based query is returned to and/or received by personal asset management application 210,310. For example, if the text-based image search was conducted on a publicly available image search engine 228,330, the resulting images based on the text-based query are returned to and received by the personal asset management application 210,310. In another example, if the text-based image search was conducted by a component of the personal asset management application 210, the resulting images based on the text-based query are received by the personal asset management application 210 (for instance, in memory or cache).

Moving now to block 430, a visually-based query (e.g., visually-based query 725 of FIG. 7) is generated using one or more of the images from the first set of result images received in accordance with the first search that was conducted based on the text-based query. In other words, at least one of the image search results that are received by the personal asset management application 210, as a result of the initial text-based query, are used to generate a visually-based query. The visually-based query, as one of ordinary skill may appreciate, is a search parameter comprising an image that is used to find other images that are visually and/or semantically similar to the image in the search parameter. The visually-based query can, in some embodiments, be employed to search not only the first plurality of images, which was subject to the search in block 410, but can also be employed to search a second plurality of images. In this regard, the visually-based query can be processed by a visually-based image search engine to search the first plurality of images (i.e., a locally stored collection of images), a second plurality of images (i.e., a remotely stored collection of images), or any combination thereof. In some embodiments, the visually-based query can include a plurality of images from the first set of result images received in accordance with the first search that was conducted based on the text-based query. As such, each image in the visually-based query will be processed by the visually-based search engine to conduct a plurality of visually-based queries. To this end, the search result images can be aggregated into a single set of result images, as will be described.

Looking now at block 440, and in accordance with the second search that was conducted based on the visually-based query (e.g., visually-based query 725 of FIG. 7), a second set of search result images is received. In other words, the visually-based query is processed to generate a set (e.g., second set of result images 735 of FIG. 7) of result images (e.g., result image(s) 740 of FIG. 7) that are visually and/or semantically similar to at least one of the images in the visually-based query. The second set of result images can be received from, as was described, the first plurality of images, the second plurality of images, or a combination thereof. Each image in the second set of result images has a visual and/or semantic similarity to at least one of the first set of result images received in accordance with the first search conducted based on the text-based query. The visual search engine, in accordance with embodiments described herein, can employ a neural network or other classifier algorithm to identify semantic content and similarity from millions of images represented by millions of tags.

In embodiments where the visually-based query includes a plurality of images from the first set of result images, and a query is conducted for each of the plurality of images in the visually-based query, the second set of search result images may include an aggregated collection of each query. In some aspects, the search result images generated therefrom can be ranked based first on determining an average semantic similarity of each image in the visually-based query, determining association scores between the averaged semantic similarity to the images that are subject to the visually-based query (i.e., the first plurality of images, the second plurality of images, or a combination thereof), and ranking the search result images accordingly. In some other aspects, the search result images generated therefrom can be ranked based on determining association scores between each individual image in the visually-based query with the images subject to the visually-based query and ranking the collective results from highest association score to lowest association score. Although described with specificity herein, the described embodiments are merely exemplary and not intended to be limiting, as the aggregating and ranking of a visually-based search query can be performed in a variety of configurations.

Figure 5:
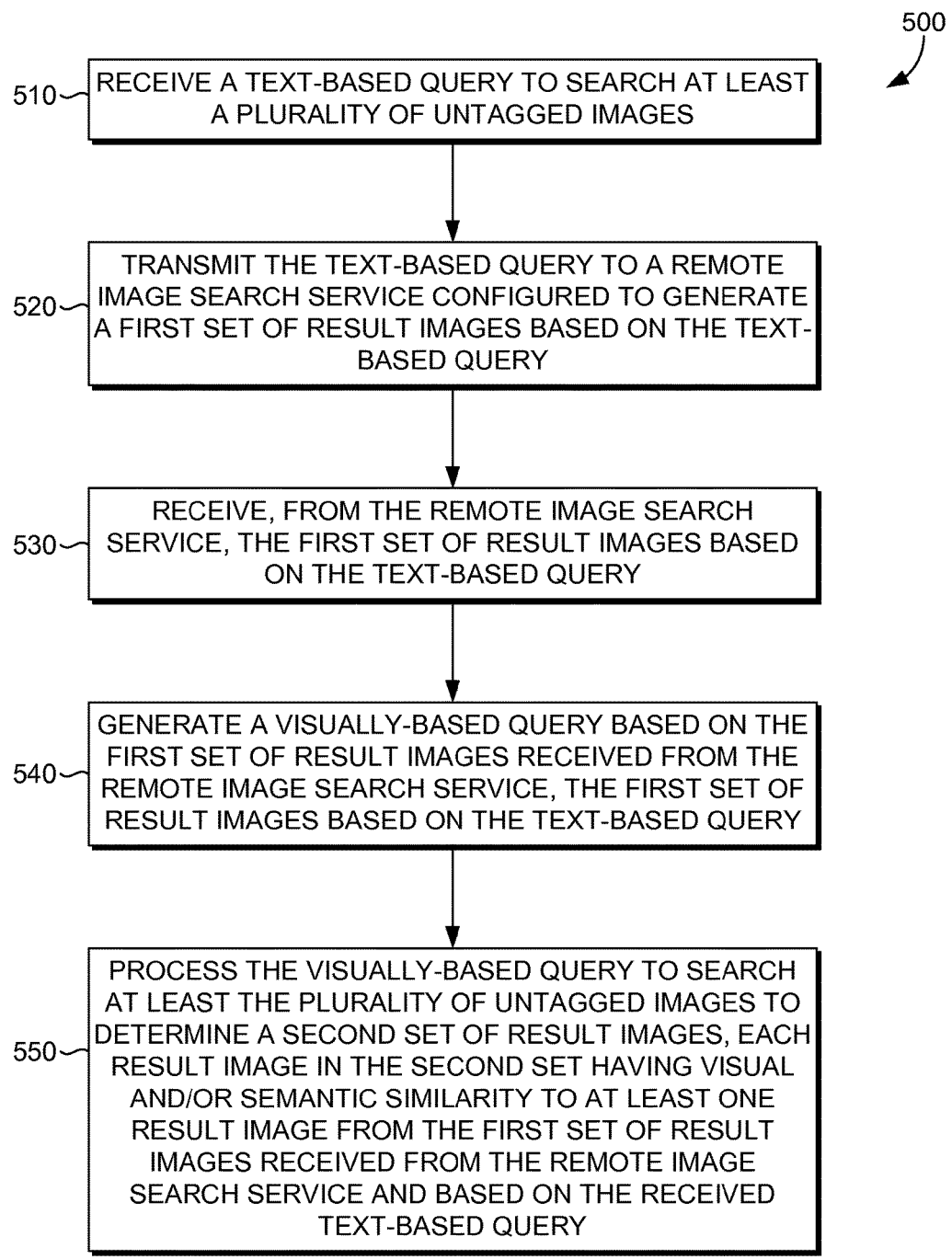
FIG. 5 is a flow diagram showing a method for searching a plurality of images with a text-based query, irrespective of images having tags associated therewith, in accordance with implementations of the present disclosure.
Figure 8:
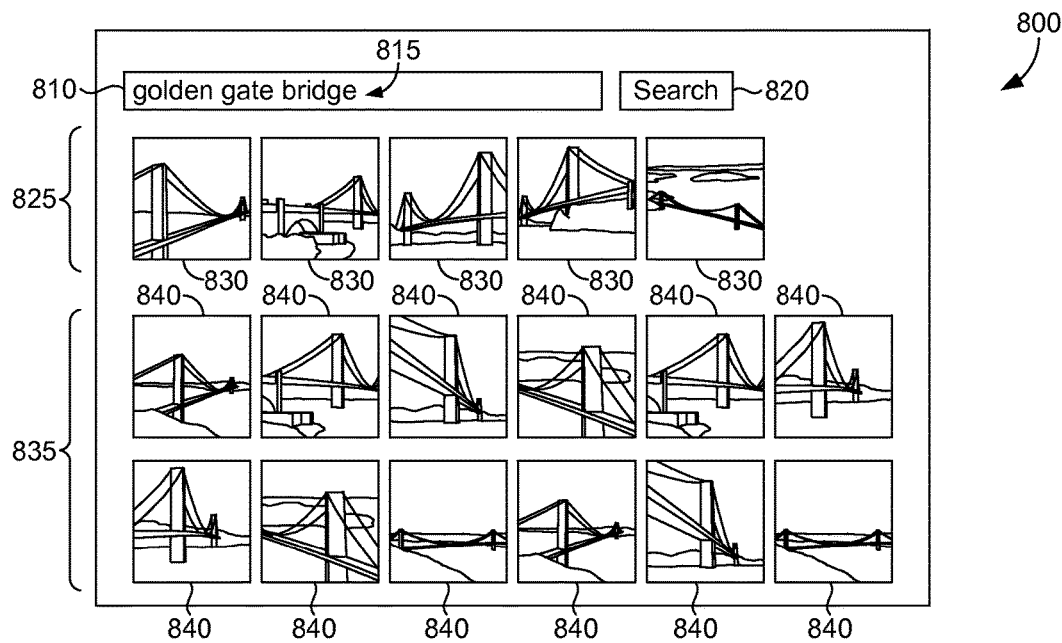
FIG. 8 is an exemplary graphical user interface for a personal asset management application, in accordance with implementations of the present disclosure.

Referring now to FIGS. 5 and 8 in light of FIGS. 1, 2, and 3, FIG. 5 is a flow diagram showing a method 500 for searching a plurality of images with a text-based query, irrespective of the images having tags associated therewith. FIG. 8 will be briefly referenced to illustrate various aspects of embodiments described herein. At block 510, a text-based query (e.g., query 815 of FIG. 8) is received for searching a plurality of images that are tagged, untagged, or a combination of both. The text-based query can be received, for instance, in a search form (e.g., search form 810 of FIG. 8) by personal asset management application 210,310, and can comprise any combination of characters (e.g., numbers or letters) configured for identifying characteristics associated with a desired search result. In other words, the text-based query includes one or more keywords that are the subject of the image search.

Continuing at block 520, the text-based query is transmitted or communicated from personal asset management application 210,310, to a remote image search service 228, 330 (i.e., a publicly accessible image search engine). The publicly accessible image search engine 228,330 (i.e., Google® Images) can be configured to determine a first set of result images (e.g., result image(s) 830 of FIG. 8) based on the text-based query. In some instances, the publicly accessible image search engine 228,330 can be configured to generate the first set of result images by identifying image tags associated with each of the result images to match at least a portion of the text-based query. In other instances, the publicly accessible image search engine 228,330 can be configured to generate the first set of result images using a proprietary search algorithm used to identify images that are relevant to the text-based query (i.e., by analyzing image metadata, website metadata, webpage descriptions or captions, etc.).

Moving to block 530, after the remote image search service 228,330 generates the first set of result images based on the text-based query, the first set of result images are received. For example, after the publicly accessible image search engine 228,330 generates the first set of result images, the personal asset management application 210,310 can either parse the first set of result images from a results webpage, or can employ an API provided by the search engine 228,330 to easily receive the result images without concern for formatting and parsing. In some instances, a script using computer code can be executed to easily parse the result images from the format provided by the publicly accessible image search engine 228,330.

Continuing at block 540, and using at least one image from the first set of result images based on the text-based query, a visually-based query (e.g., visually-based query 825 of FIG. 8) is generated. In other words, at least one of the image search results that are received by the personal asset management application 210, as a result of the initial text-based query, are used to generate a visually-based query. The visually-based query, as one of ordinary skill may appreciate, is a search parameter comprising an image that is used to find other images that are visually and/or semantically similar to the image in the search parameter. The visually-based query can, in some embodiments, be employed to search any set of images managed by the personal asset management application 210. In this regard, the visually-based query can be processed by a visually-based image search engine 250,355 to search, among other things, a locally stored collection of images, a remotely stored collection of images, or any combination thereof.

Finally, at block 550, the visually-based query is processed to search at least the plurality of untagged images that were subject to the first text-based query in block 510. As was described, the search can be processed on any plurality of images managed by the asset management application 210. Processing the visually-based query can generate a set (e.g., second set of result images 835 of FIG. 8) of result images (e.g., result image(s) 840 of FIG. 8) that are visually and/or semantically similar to at least one of the images in the visually-based query. The second set of result images can be received from, as was described, a locally stored collection of images, a remotely stored collection of images, or a combination thereof. Each image in the second set of result images has a visual and/or semantic similarity to at least one of the first set of result images received in accordance with the first search conducted based on the text-based query. The visual search engine, in accordance with embodiments described herein, can employ a neural network or other classifier algorithm to identify visual similarity and/or semantic content and similarity from millions of images represented by millions of tags.

Figure 6:
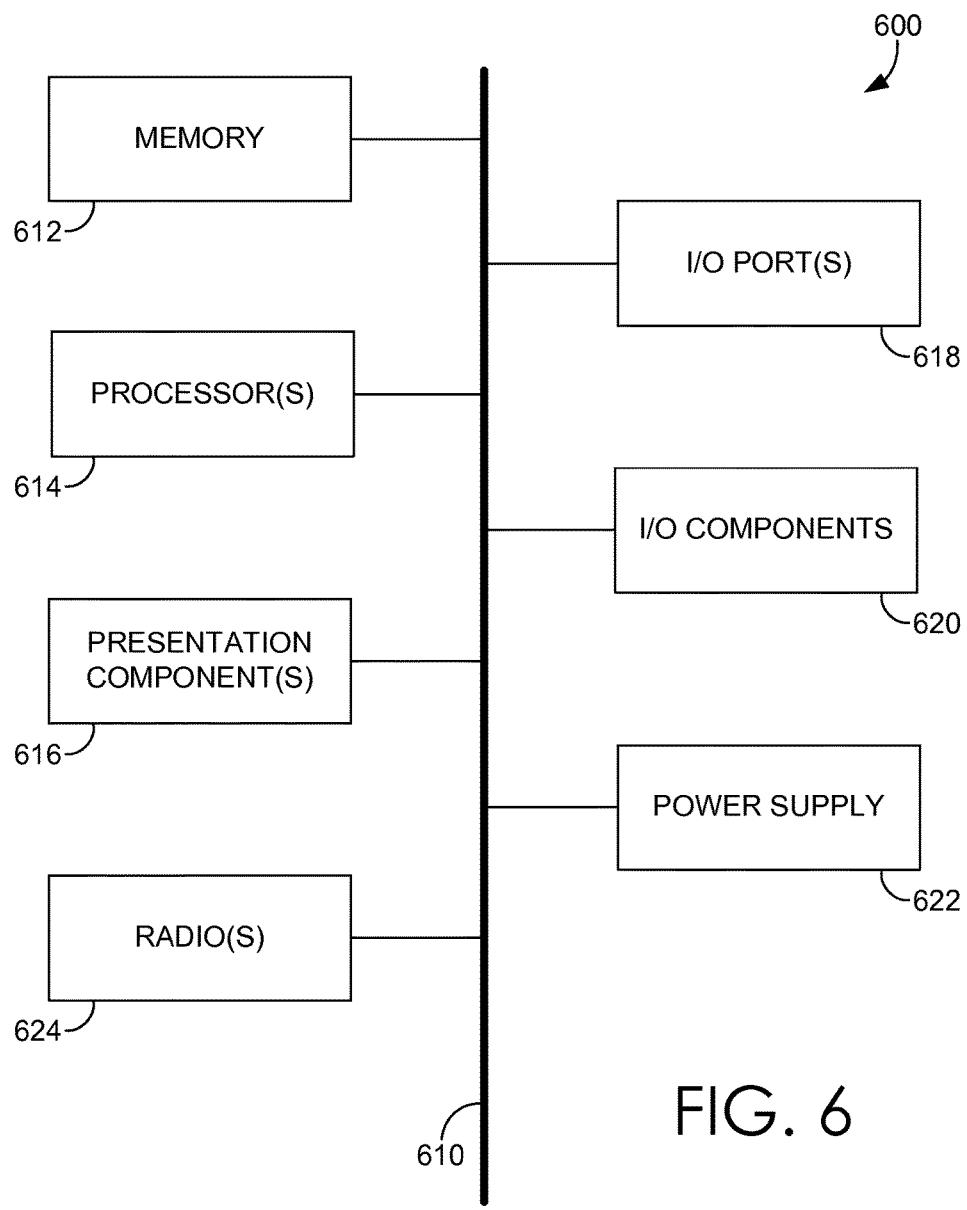
FIG. 6 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As described above, implementations of the present disclosure provide for facilitating text-based image searches on untagged images, as well as tagged images. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium storing computer-useable instructions that, when used by at least one computing device, cause the at least one computing device to perform operations comprising:

receiving, via an interface prior to a presentation of at least one search result image, a text-based query to search a set of images;

receiving, prior to the presentation of the at least one search result image as a response to the received text-based query, a set of text-based search result images that is generated based on the received text-based query, wherein a text-based search result image of the received set has at least one tag that corresponds to at least a portion of the received text-based query;

generating, prior to the presentation of the at least one search result image as the response to the received text-based query, a set of visually-based search result images utilizing at least one image of the set of text-based search result images, the set of visually-based search result images being generated based at least in part on one or more determined visual similarity scores; and presenting, via the interface, the generated set of visually-based search result images including the at least one search result image in response to the received text-based query.

2. The medium of claim 1, wherein the set of images is stored on at least one local storage medium.

3. The medium of claim 2, wherein the set of text-based search result images is generated by and received from a remote image search service.

4. The medium of claim 1, wherein the set of images is stored on at least one remote storage medium.

5. The medium of claim 4, wherein the at least one remote storage medium is an access-limited cloud storage device.

6. The medium of claim 1, the computer-usable instructions that, when used by the at least one computing device, cause the at least one computing device to perform operations further comprising:

generating a refined set of visually-based search result images based on a selected set of visually-based search result images of the presented set of visually-based search result images, the refined set of visually-based search result images being generated based at least in part on one or more additionally-determined visual similarity scores; and presenting, via the interface, the refined set of visually-based search result images.

7. The medium of claim 1, wherein the one or more visual similarity scores-are determined by a neural network.

8. The medium of claim 7, wherein the one or more visual similarly scores are determined based at least in part on a comparison of image feature vectors performed by the neural network.

9. A computer-implemented method for searching untagged images with text-based queries, the method comprising:

receiving, via an interface of an asset management application prior to a presentation of at least one search result image, a text-based query to search at least a set of untagged images;

employing, by the asset management application prior to the presentation of at least one search result image, a remote image search service to generate a set of text-based search result images based on the received text-based query;

generating, by at least the asset management application prior to the presentation of at least one search result image as a response to the received text-based query, and in response to the receipt of the set of text-based search result images from the remote image search service, a set of visually-based search result images utilizing at least one image of the set of text-based search result images based at least in part on one or more determined visual similarity scores; and presenting, via the interface of the asset management application, the generated set of visually-based search result images including the at least one search result image in response to the received text-based query.

10. The method of claim 9, wherein at least the set of untagged images is stored on a local storage device.

11. The method of claim 9, wherein the remote image search service is a publicly-accessible image search engine.

12. The method of claim 9, wherein the one or more visual similarity scores-are determined by a neural network.

13. The method of claim 12, wherein the one or more visual similarly scores are determined based at least in part on a comparison of image feature vectors performed by the neural network.

14. The method of claim 12, wherein the one or more visual similarly scores are determined based further in part on an identification of semantic similarities made by the neural network.

15. The method of claim 14, wherein the semantic similarities include content classifications.

16. A computerized system comprising:

one or more processors; and one or more computer storage media storing computer-usable instructions that, when used by the one or more processors, cause the one or more processors to:

receive, prior to a presentation of at least one search result image, a text-based query to search a set of untagged images;

transmit, prior to the presentation of at least one search result image as a response to the received text-based query, the text-based query to a remote image search service to generate a set of text-based search result images;

generate, prior to the presentation of at least one search result image as the response to the received text-based query and in response to receiving the generated set of text-based search result images from the remote image search service, a set of visually-based search result images utilizing at least one image of the set of text-based search result images based at least in part on one or more determined visual similarity scores;

present the generated set of visually-based search result images including the at least one search result image in response to the received text-based query;

generate, in response to receiving a selected portion of the presented set of visually-based search result images, a refined set of visually-based search result images based at least in part on one or more additionally-determined visual similarity scores; and present the generated refined set of visually-based search result images as a response to receiving the selected portion of the presented set of visually-based search result images.

17. The system of claim 16, wherein the one or more visual similarity scores-are determined by a neural network.

18. The system of claim 17, wherein the visual similarity comparisons are characterized with image similarity scores.

19. The system of claim 17, wherein the one or more visual similarly scores are determined based at least in part on a comparison of image feature vectors performed by the neural network.

20. The system of claim 16, wherein the set of untagged images is stored on a local storage device.

* * * * *